United States Patent [19]

Gotou et al.

[11] Patent Number: 5,791,687
[45] Date of Patent: Aug. 11, 1998

[54] SEAT BELT DEVICE FOR VEHICLE

[75] Inventors: Youji Gotou; Yutaka Ohno; Yukihiro Yamaguchi, all of Wako, Japan

[73] Assignee: Honda Giken Kogyo Kabushiki Kaisha, Tokyo, Japan

[21] Appl. No.: 780,067

[22] Filed: Dec. 23, 1996

[30] Foreign Application Priority Data

Dec. 27, 1995 [JP] Japan .................................. 7-352058

[51] Int. Cl.[6] .................................................. B60R 22/28
[52] U.S. Cl. ............................ 280/805; 280/808; 297/471
[58] Field of Search ............................ 280/801.1, 808, 280/805; 297/470, 471, 472, 483

[56] References Cited

U.S. PATENT DOCUMENTS 5,085,566  2/1992  Hirase et al. .................. 280/801.1
5,464,252  11/1995  Kahazawa et al. ................ 280/805
5,692,780  12/1997  Yasai .......................... 280/801.2

*Primary Examiner*—Christopher P. Ellis
*Attorney, Agent, or Firm*—Armstrong, Westerman, Hattori, McLeland, & Naughton

[57] ABSTRACT

A seat belt device for a vehicle having a good shock absorbing function for impact from the car-room side as well as sufficient person binding performance is provided. The seat belt device has an anchor member attached to an upper portion of a vehicle pillar and comprises a shock absorbing member provided on the pillar, supported by the pillar in a direction from an exterior side to an interior side of a car-room, and deformable in a direction from the interior side to the exterior side; a connecting means for connecting the shock absorbing member with the anchor member; and a spacer member interposed between the shock absorbing member and the anchor member for keeping the anchor member apart from the pillar.

5 Claims, 11 Drawing Sheets

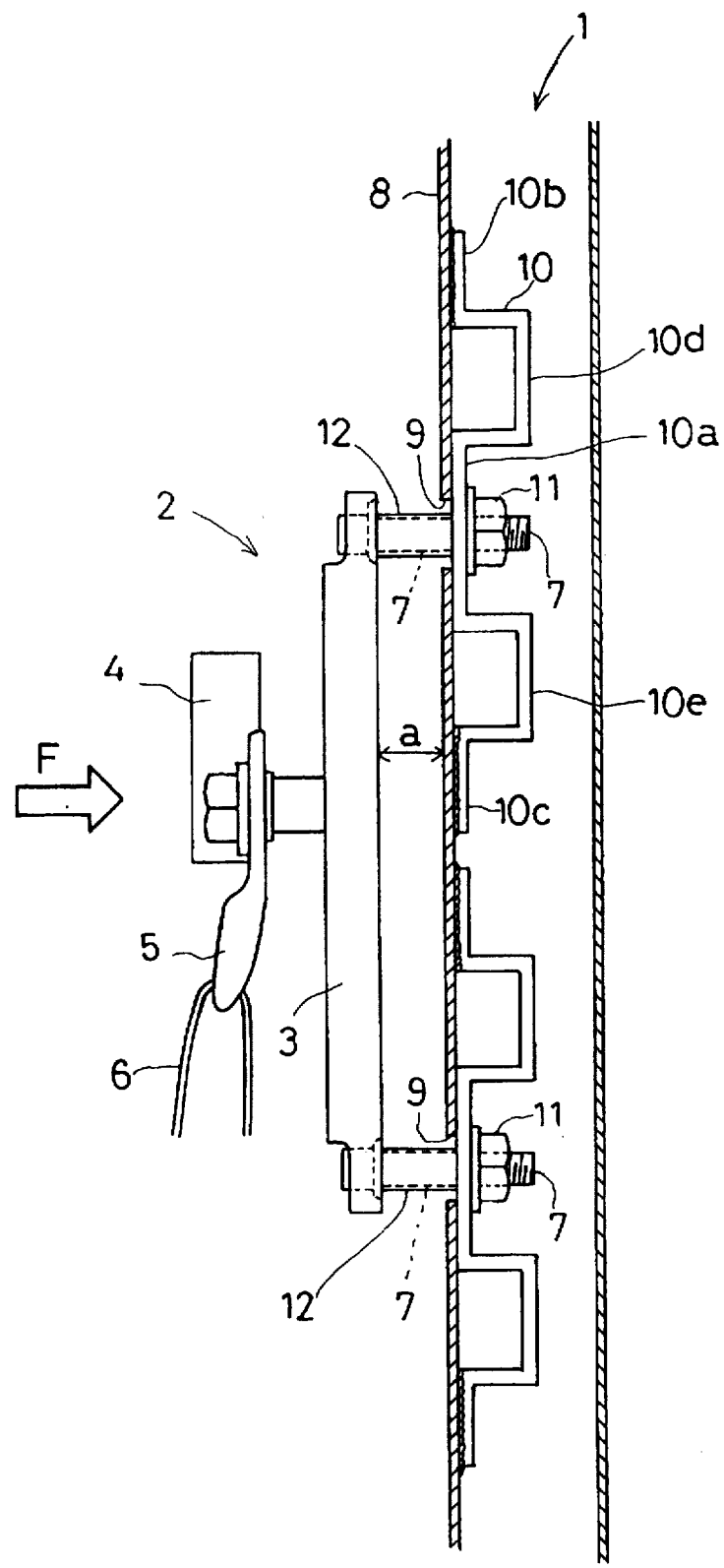
F I G. 1

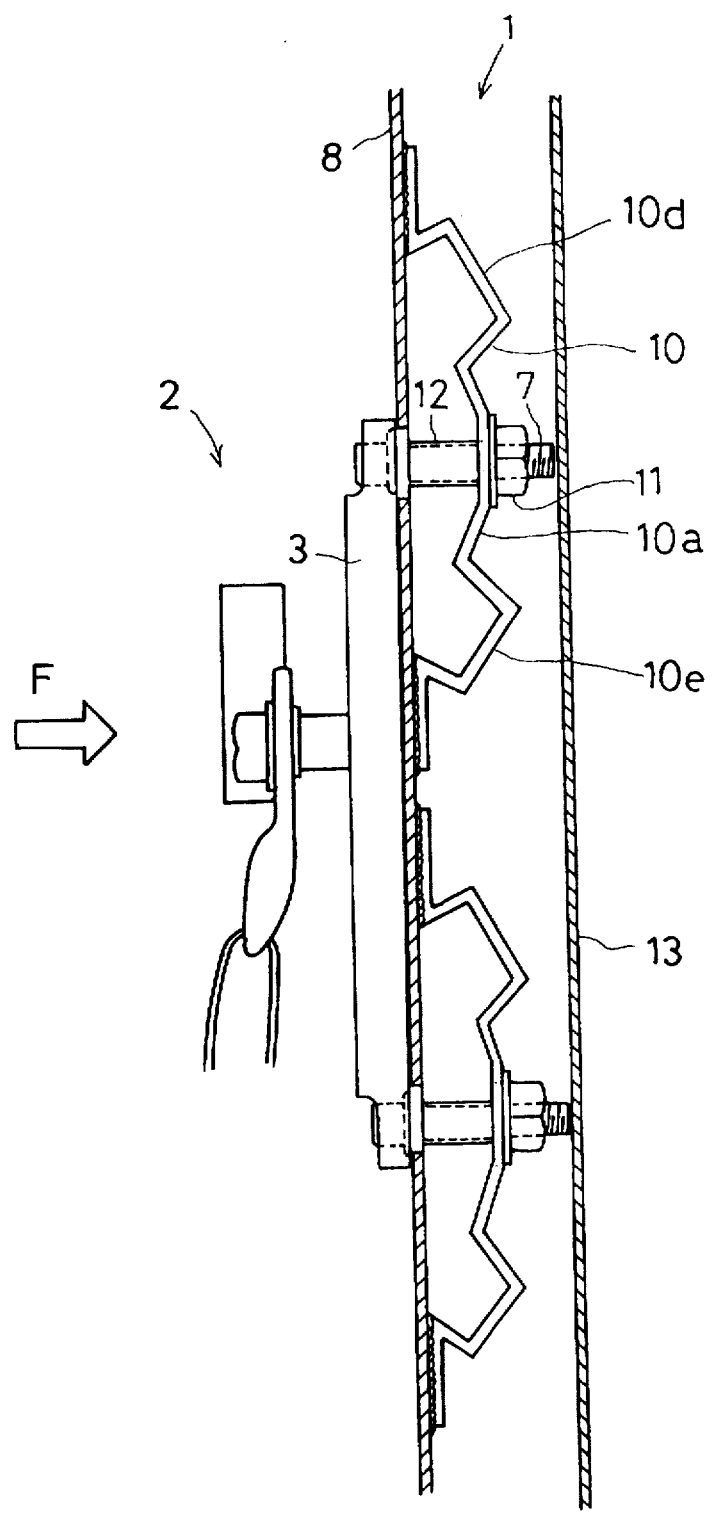
F I G. 2

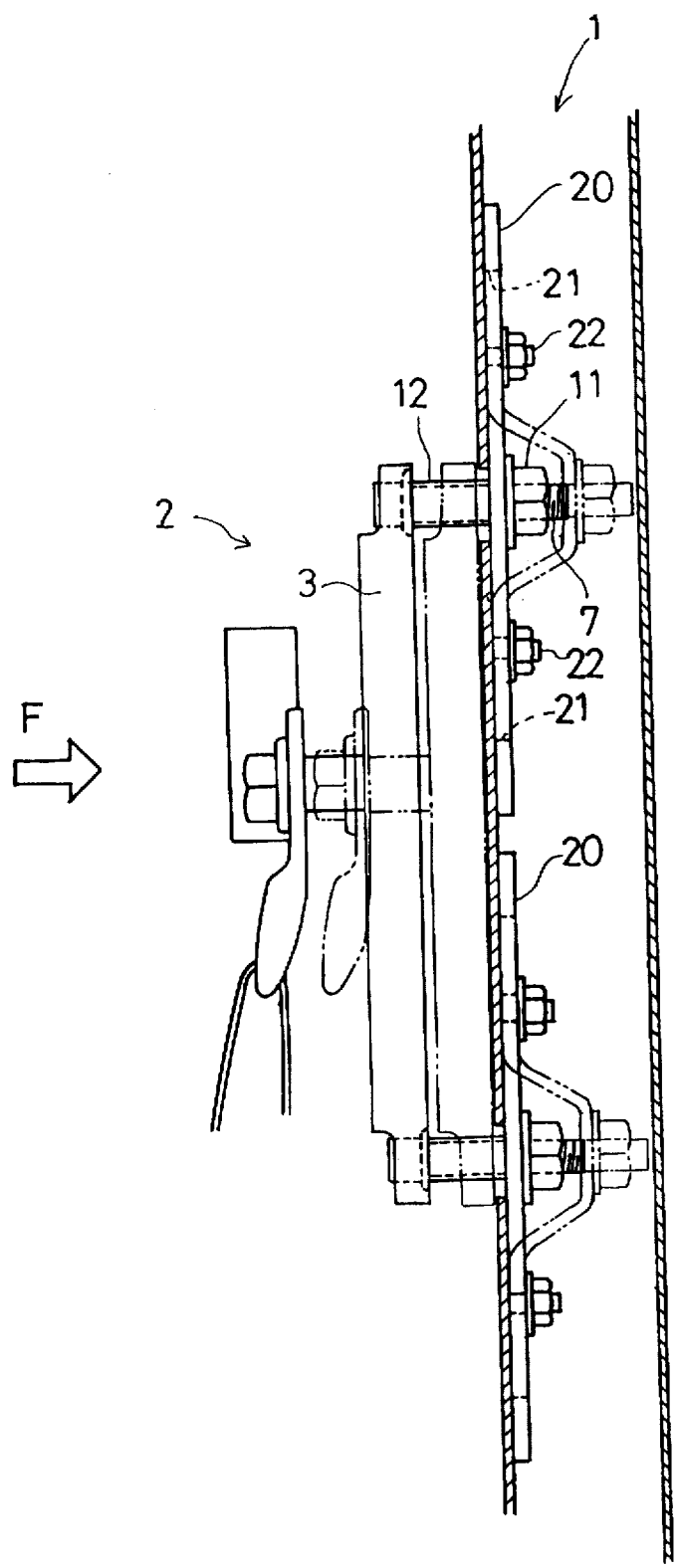
F I G. 4

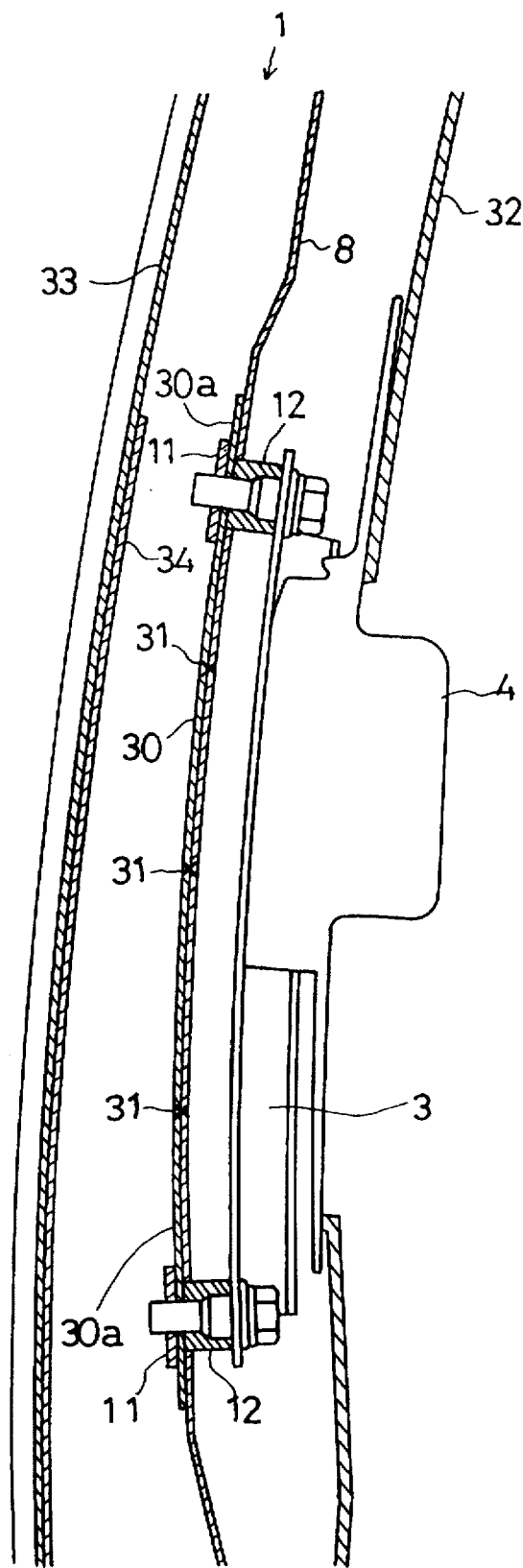
F I G . 7

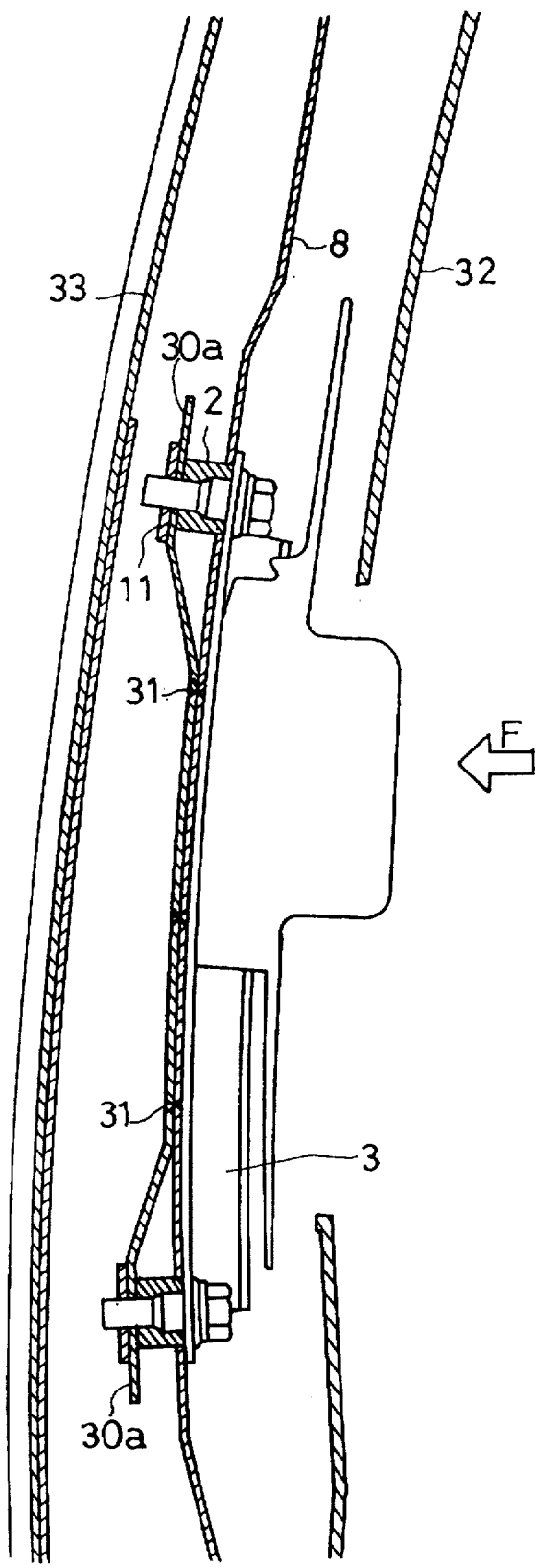
F I G . 8

SEAT BELT DEVICE FOR VEHICLE

BACKGROUND OF THE INVENTION

This invention relates to a seat belt device for a vehicle such as a motorcar, and particularly to an anchor member equipped to an upper portion of a pillar of the vehicle.

A seat belt provided in a motorcar for protecting a person by binding him to a seat is attached to a proper place of a car-body through an anchor member, and generally, the anchor member for a shoulder belt is attached to an upper portion of a pillar such as a center pillar.

Hitherto, the anchor member had a high rigidity by itself in order to make the seat belt exhibit an effective binding performance and was fixed to the pillar directly and firmly.

Recently, trim members within the car-room of the motorcar has been required to have energy absorbing function for impact from the car-room side, but the above-mentioned anchor member of high rigidity fixed to the pillar directly and firmly has not an energy absorbing ability.

SUMMARY OF THE INVENTION

Therefore, an object of the invention is to provide a seat belt device for a vehicle with an improved anchor member having good energy absorbing ability, that is shock absorbing function, for impact from the car-room side as well as sufficient person binding performance as ever.

In order to accomplish the aforesaid object, the present invention provides a seat belt device for a vehicle having an anchor member attached to an upper portion of a vehicle pillar, comprising a shock absorbing member provided on the pillar, supported by the pillar in a direction from an exterior side to an interior side of a car-room, and deformable in a direction from the interior side to the exterior side; a connecting means for connecting the shock absorbing member with the anchor member; and a spacer member interposed between the shock absorbing member and the anchor member for keeping the anchor member apart from the pillar to the car-room side.

According to the invention, since the anchor member connected to the shock absorbing member is kept apart from the pillar toward the car-room side and the shock absorbing member is deformable toward the exterior side from the interior side of the car-room, when an impact force acts on the anchor member from the car-room side, the anchor member can move until it abuts against the pillar deforming the shock absorbing member to absorb and mitigate the shock energy.

On the one hand, since the shock absorbing member is supported by the pillar in the direction from the exterior side to the interior side of the car-room so as to be one body with the pillar, movement of the anchor member by a tension of the seat belt toward the car-room side is prevented and a sufficient person binding performance can be achieved as ever.

According to an aspect of the invention, in a seat belt device for a vehicle having an anchor member attached to an upper portion of a vehicle pillar as described above, the device comprises a rod member penetrating an inner member of the pillar and having an inner end positioned within a car-room connected with the anchor member; an abutment section provided at an outer end of the rod member positioned within the pillar for abutting against the inner member; a means for forcing the rod member toward the car-room side to keep the anchor member apart from the pillar to the car-room side; and a shock absorbing member provided within the pillar, deformable in a direction from an interior side to an exterior side of the car-room and opposite to the outer end of the rod member axially.

According to another aspect of the invention, in place of the above-mentioned shock absorbing member, a spacer member for keeping the anchor member apart from the pillar to the car-room side is interposed between the pillar and the anchor member along the rod member so that a shock applied to the anchor member is absorbed by axial compressive deformation of the spacer member.

BRIEF DESCRIPTION OF THE DRAWINGS

FIG. 1 is a vertical view of a seat belt device of the invention attached to a center pillar of a motorcar;

FIG. 2 is a vertical view showing a state of the seat belt device when a force acts from the car-room side;

FIG. 4 is a vertical view similar to FIG. 1 showing another embodiment of the invention;

FIG. 7 is a vertical view similar to FIG. 1 showing the other embodiment of the invention;

FIG. 8 is a vertical view showing a state of the seat belt device in the embodiment when a force acts from the car-room side;

DETAILED DESCRIPTION OF THE PREFERRED EMBODIMENT

Figure 3:
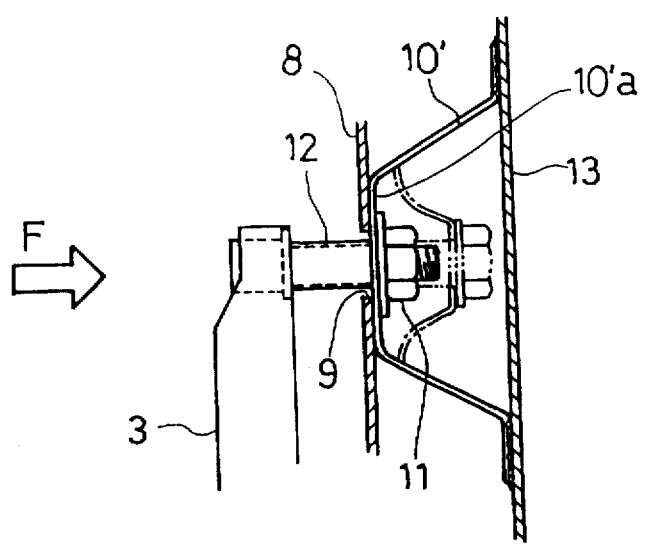
FIG. 3 is a partial vertical view showing a modification of the seat belt device.

FIG. 1 shows a preferred embodiment of the invention. 1 denotes a center pillar of a motorcar and 2 denotes a seat belt device. An anchor rail 3 which is an anchor member of the seat belt device is attached to an upper portion of the center pillar 1 and equipped with a D-ring 5 capable of adjusting its position by an anchor adjusting mechanism 4. A seat belt 6 is inserted in the D-ring 5 and supported by the D-ring hanging down. In FIG. 1, the left side of the center pillar 1 is the interior of the car-room, therefore, the seat belt device 2 is provided in the car-room side with respect to the center pillar 1.

At both upper and lower end portions of the anchor rail 3 are provided bolts 7 each having an inner end fixed to the anchor rail 3 and projecting toward the exterior side of the car-room. An outer portion of the bolt 7 passes through a hole 9 provided in an inner member 8 of the center pillar 1 and projects within the center pillar 1. The bolt 7 further passes through a shock absorbing member 10 provided on the reverse side around the hole 9 and engages with a nut 11 at the outside. A spacer collar 12 is interposed between the anchor rail 3 and the shock absorbing member 10 around the bolt 7 with both ends abutting against the anchor rail 3 and the shock absorbing member 10 respectively. Therefore, when the shock absorbing member 10 is fastened to an end face of the spacer collar 12 by the nut 11, the anchor rail 3 is connected to the shock absorbing member 10 through the spacer collar 12 firmly.

The shock absorbing member 10 is made of a metal plate for example, which has plane parts 10a, 10b, 10c formed along the reverse surface of the inner member 8 at a center portion around the hole 9 and both upper and lower end portions respectively, and bent parts 10d, 10e of U-shaped section formed between the plane parts 10a and 10b and the plane parts 10a and 10c respectively projecting outward. The upper and lower plane parts 10b, 10c are fixed to the inner member 8 by welding or adhesion.

Usually, since the plane part 10a lies along the surface of the inner member 8, the anchor rail 3 is kept by the spacer collar 12 apart from the inner member 8, that is the center pillar, to the car-room side by a distance a, However, the anchor rail 3 is not parted further even if a force directed inside of the car-room acts on the anchor rail 3 by a tension of the seat belt 6 because the plane part 10a abuts on the inner member 8, and the force is transmitted to the inner member 8 through the plane part 10a to be received by the center pillar 1, so that a sufficient person binding performance is obtainable.

On the one hand, when an impact force acts on the anchor rail 3 from inside of the car-room as shown by the arrow F in FIG. 1, the force is transmitted to the plane part 10a of the shock absorbing member 10 through the bolt 7, the nut 11 and the spacer collar 12 to move it toward the outside of the car-room. Since the plane part 10a merely abuts on the inner member 8, if the force overcomes rigidity of the shock absorbing member 10, the plane part 10a moves toward outside of the car-room together with the bolt 7, the nut 11 and the spacer collar 12. Since the plane parts 10b, 10c at the both ends of the shock absorbing member 10 are fixed to the inner member 8, eventually the shock absorbing member 10 is deformed plastically at the plane part 10a and the bent parts 10d, 10e as shown in FIG. 2.

In the above-mentioned embodiment, the both ends of the shock absorbing member 10 are fixed to the inner member 8 of the center pillar 1. However, like a shock absorbing member 10' shown in FIG. 3, the both ends may be fixed to an outside member 13 opposite to the inner member 8 such as an outer member of the center pillar 1 or a stiffener interposed between the inner member 8 and the outer member. The shock absorbing member 10' has a plane part 10'a abutting on the reverse surface of the inner member 8 around the hole 9 similarly to the plane part 10a of the above-mentioned shock absorbing member 10 and is connected to the anchor rail 3 with the plane part 10'a pinched between the nut 11 and the spacer collar 12. The shock absorbing member 10' is deformed by the force F as shown by the broken line in FIG. 3 for absorbing the shock.

Hereinafter, other preferred embodiments of the invention will be described with reference to FIGS. 4 to 14 in which portions similar to the portions in the above-mentioned FIG. 1 are denoted by the same reference numerals and detailed description thereof will be omitted suitably.

In an embodiment shown in FIG. 4, a shock absorbing member 20 which has a somewhat different construction from that of the shock absorbing member 10 of FIG. 1 is used. Namely, the shock absorbing member 20 in this embodiment is pinched at the central portion between the nut 11 and the spacer collar 12 similarly to the aforementioned shock absorbing member 10, however, at the both upper and lower end portions are provided slits 21 respectively, and the both end portions are attached to the inner member 8 by bolts 22 inserted in the slits 21 so as to slide freely (see FIG. 5A).

Figures 5A, 5B:
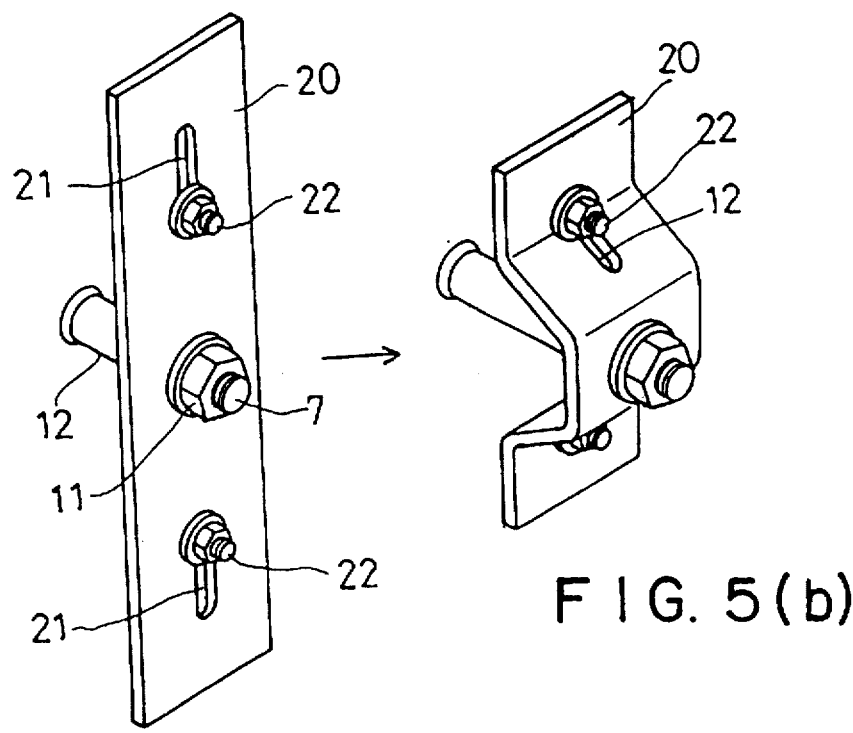
FIG. 5A is a perspective view of a shock absorbing member in the same embodiment showing a state before deformation.
FIG. 5B is a perspective view similar to FIG. 5A showing a state after deformation.

When the anchor rail 3 is moved to the side of the center pillar 1 by a force F acting on the seat belt device 2, the shock absorbing member 20 is pushed by the spacer collar 12 and deformed from the state of solid line to the state of broken line in FIG. 4, or from the state of FIG. 5A to the state of FIG. 5B, to absorb the shock. This deformation is carried out very smoothly by mutual sliding of the slit 21 and the bolt 22.

Figure 6:
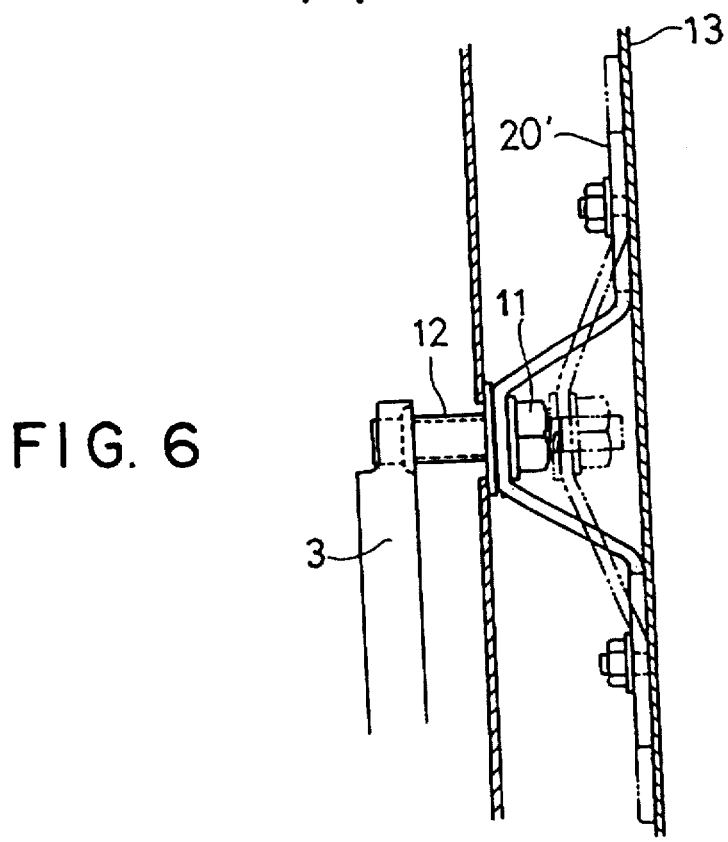
FIG. 6 is a partial vertical view showing a modification of the seat belt device of FIG. 4.

FIG. 6 shows an embodiment having a shock absorbing member 20' similar to the shock absorbing member 20 attached to the outside member 13 side.

In an embodiment of FIG. 7, a shock absorbing member 30 is a strip-shaped plate elongated up and down, and lies along the reverse surface (the surface not facing the car-room) of the inner member 8 with a middle portion fixed to the inner member 8 by spot weldings 31 suitably. Both upper and lower end edge portions of the shock absorbing member 30 are formed into free end portions 30a, 30a not fixed to the inner member 8. And the free end portion 30a is pinched by the nut 11 and the spacer collar 12 similar to the aforementioned embodiments to be connected with the anchor rail 3. When an impact force acts on the anchor rail 3 from the car-room side (the right side in FIGS. 7, 8), the free end portion is deformed as shown in FIG. 8 to absorb the shock.

In FIG. 7, 32 denotes a pillar garnish covering the center pillar 1 from the car-room side for ornament, 33 and 34 denoting an outer member of the center pillar 1 and a stiffener respectively.

Figure 9:
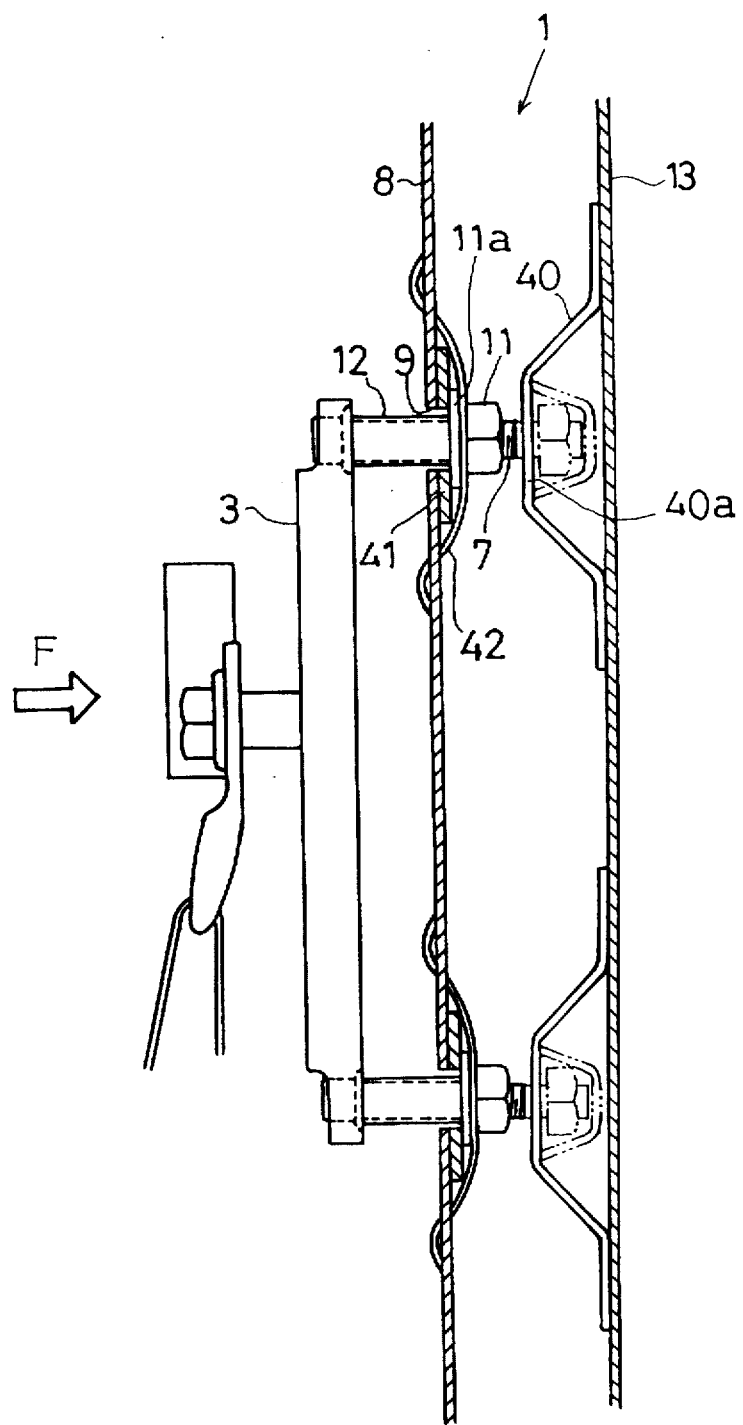
FIG. 9 is a vertical view similar to FIG. 1 showing further another embodiment of the invention.

Constructions of the bolt 7, the nut 11 and the spacer collar 12 in FIG. 9 are similar to those in FIG. 1, however in FIG. 1, the shock absorbing member 10 is interposed between the space collar 12 and the nut 11 and the space collar 12 abuts against the shock absorbing member 10, whereas in FIG. 9, no shock absorbing member is interposed between the spacer collar 12 and the nut 11 and an end of the spacer collar 12 abuts directly against a washer 11a integral with the nut 11. 41 is a reinforcing patch plate fixed to periphery of the hole 9. The spacer collar 12 penetrates through the patch plate 41 to abut against the above washer 11a.

Figure 10:
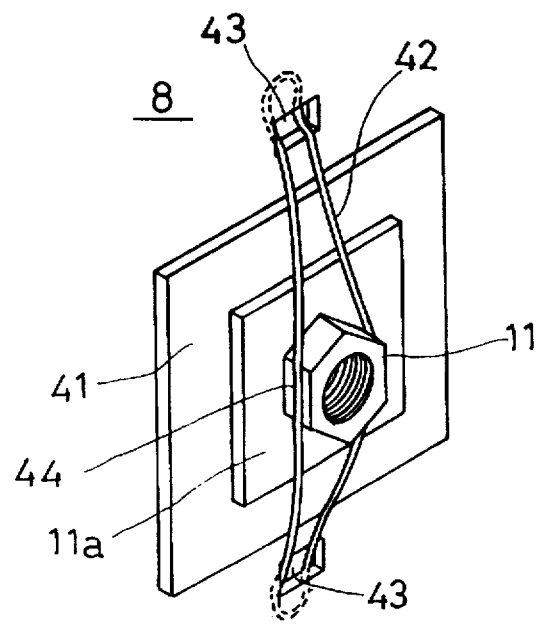
FIG. 10 is an enlarged perspective view of a nut portion in the embodiment.
Figure 11:
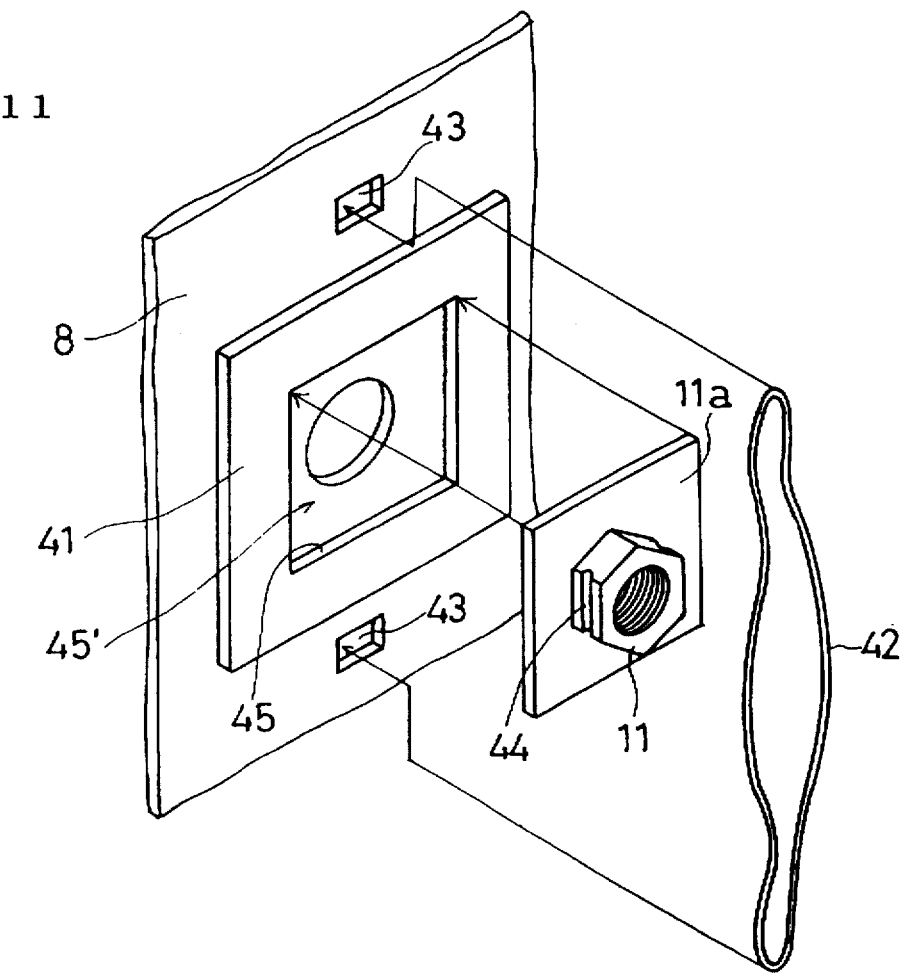
FIG. 11 is a disassembled perspective view showing a modification of the nut portion.

As shown in FIG. 10 by an enlarged perspective view, a steel clip 42 having both upper and lower ends engaged with engaging holes 43 provided in the inner member 8 is provided so as to press the nut 11 toward the car-room side. Therefore, the anchor rail 3 is energized by elastic force of clip 42 through the nut 11 and the spacer collar 12 to be kept at the position of FIG. 9 apart from the inner member 8.

In this embodiment, a shock absorbing member 40 is provided on the outside member 13. The shock absorbing member 40 has a pressure receiving face portion 40a axially opposite to the tip end of the bolt 7. The pressure receiving face portion 40a may be separated from or contacted with the tip end. When an impact force F acts on the anchor rail 3 from the car-room side to push the bolt 7, the nut 11 and the spacer collar 12 into the center pillar 1, the clip 42 drops out and the bolt 7 squashes and deforms the shock absorbing member 40 as shown by broken lines in FIG. 9 to absorb the shock. As for the shock absorbing member 40, in place of the bent plate member shown in FIG. 9, a solid body made of a plastics adapted to be squashed by the bolt 7 may be used.

As shown in FIG. 10, the clip 42 is engaged with grooves 44 formed by whittling both side faces of the main part of the nut 11 (see FIG. 11) to serve as a turning arrester for the nut 11 too. In addition, a measure as follows may be taken. A washer part 11a of the nut 11 which is usually formed in a shape of circular plate is formed in a square shape particularly and the patch plate 41 is provided with a square hole 45 which the washer part 11a fits into. In this case, on the surface of the inner member 8 is formed a recess 45' by the hole 45 and the washer part 11a fits into the recess 45' so that turning of the nut 11 can be arrested more surely.

Also, in such a configuration, since a step between the surfaces of the inner member 8 and the washer part 11a becomes small, fitting of the clip 42 to the engaging holes 43 is easy and surer.

Figure 12:
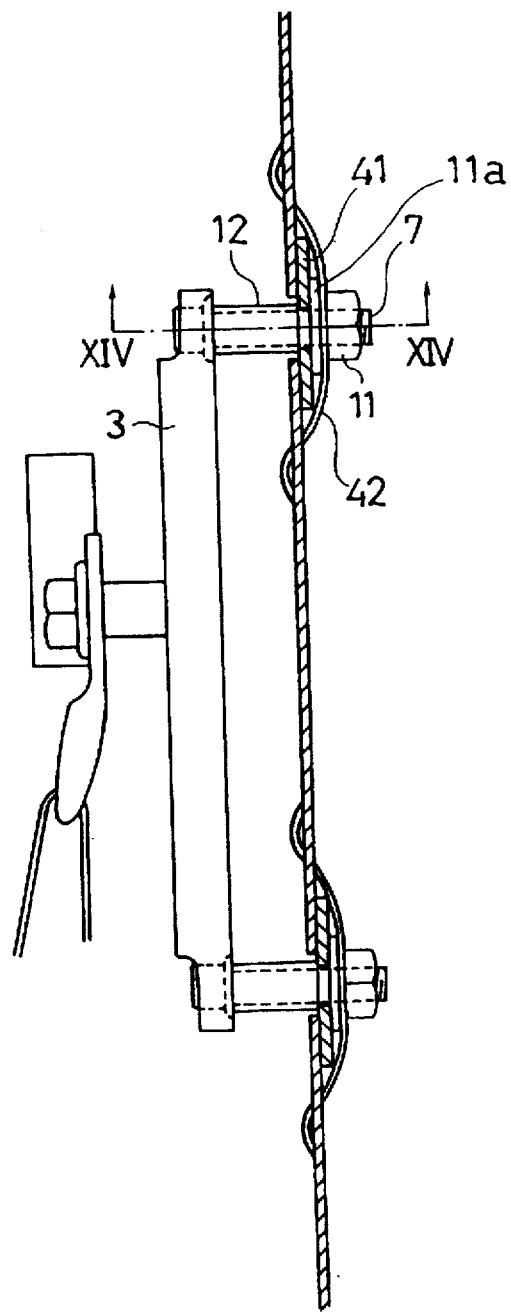
FIG. 12 is a vertical view similar to FIG. 1 showing the other embodiment of the invention.
Figure 13:
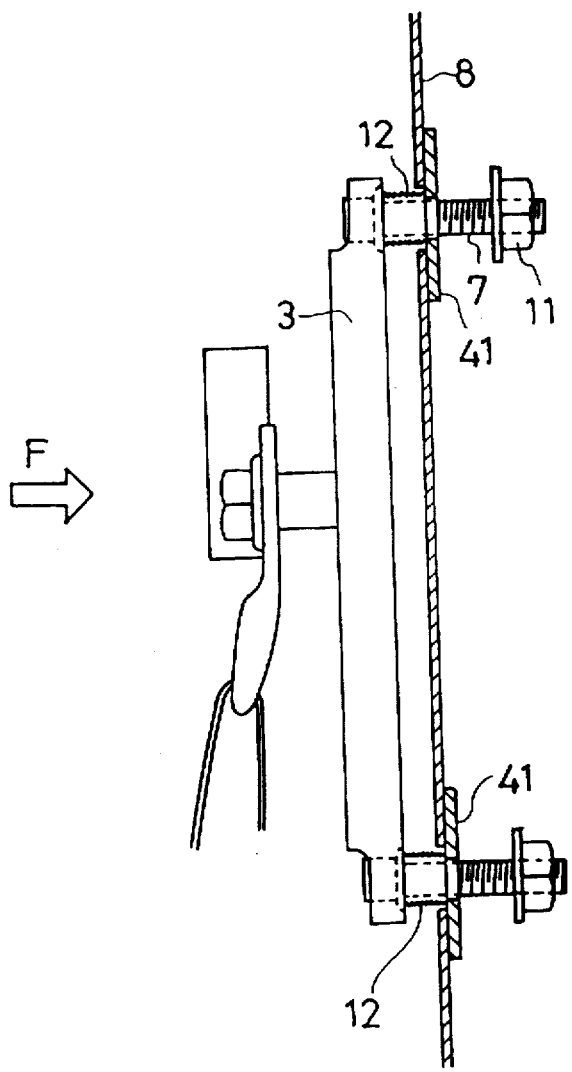
FIG. 13 is a vertical view showing a state of the seat belt device in the embodiment when a force acts from the car-room side.
Figure 14:
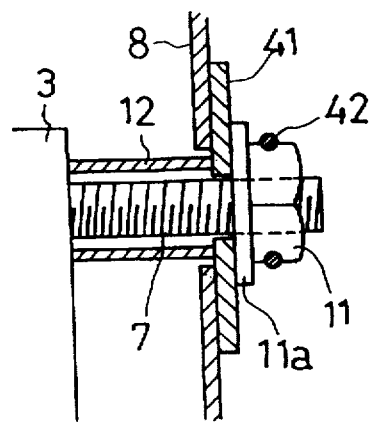
FIG. 14 is an enlarged sectional view along the line XIV—XIV of FIG. 12.

FIGS. 12 to 14 show the other embodiment of the invention. This embodiment has an anchor rail 3, a bolt 7, a nut 11, a spacer collar 12, a patch plate 41 and a clip 42 which are quite the same as those of the embodiment shown in FIG. 9. However, in the embodiment of FIG. 9, the spacer collar 12 abuts against the washer part 11a of the nut 11, whereas in this embodiment, the space collar 12 abuts against the patch plate 41 fixed to the inner member 8.

When an impact force F acts on the anchor rail 3 from the car-room side, the anchor rail 3 moves to push the bolt 7 and the nut 11 into the center pillar 1 and the clip 42 drops out in the same manner as in case of FIG. 9, but the spacer collar 12 which abuts against the patch plate 41 integral with the inner member 8 is compressed axially between the anchor rail 3 and the patch plate 41 and buckles to absorb the shock. In this embodiment, since the space collar 12 functions as a shock absorbing member, there is not provided any special shock absorbing member as in the aforementioned embodiments. Of course, the space collar 12 having shock absorbing function can be used together with the aforementioned shock absorbing member.

What is claimed is:

1. A seat belt device for a vehicle having an anchor member attached to an upper portion of a vehicle pillar, comprising:
    a shock absorbing member provided on said pillar, supported by said pillar in a direction from an exterior side to an interior side of a car-room, and deformable in a direction from the interior side to the exterior side;
    a connecting means for connecting said shock absorbing member with said anchor member; and
    a space member interposed between said shock absorbing member and said anchor member for keeping said anchor member apart from said pillar.

2. A seat belt device for a vehicle as claimed in claim 1, wherein said shock absorbing member has both end portions fixed to said pillar and a middle portion separated from said pillar and connected to said anchor member.

3. A seat belt device for a vehicle as claimed in claim 2, wherein said shock absorbing member is a plate-like member having slits at said end portions, and said end portions are fixed to said pillar by screw members capable of sliding along said slits.

4. A seat belt device for a vehicle as claimed in claim 1, wherein said shock absorbing member is a plate-like member having a middle portion fixed to said pillar and free end portions connected to said anchor member.

5. A seat belt device for a vehicle having an anchor member attached to an upper portion of a vehicle pillar, comprising:
    a rod member penetrating an inner member of said pillar and having an inner end positioned within a car-room and connected with said anchor member;
    an abutment section provided at an outer end of said rod member positioned within said pillar for abutting against said inner member;
    a means for forcing said rod member toward the car-room side to keep said anchor member apart from said pillar to the car-room side; and
    a shock absorbing member provided within said pillar, deformable in a direction from an interior side to an exterior side of said car-room and opposite to said outer end of said rod member axially.

* * * * *